(12) United States Patent
Buzruk

(10) Patent No.: US 10,513,468 B2
(45) Date of Patent: Dec. 24, 2019

(54) COMPOSTING DEVICE WITH SLIDING LID

(71) Applicant: WHIRLPOOL CORPORATION, Benton Harbor, MI (US)

(72) Inventor: Abhishek P. Buzruk, Maharashtra (IN)

(73) Assignee: Whirlpool Corporation, Benton Habor, MI (US)

( * ) Notice: Subject to any disclaimer, the term of this patent is extended or adjusted under 35 U.S.C. 154(b) by 157 days.

(21) Appl. No.: 15/172,200

(22) Filed: Jun. 3, 2016

(65) Prior Publication Data
US 2017/0349501 A1 Dec. 7, 2017

(51) Int. Cl.
C05F 17/02 (2006.01)
C05F 9/02 (2006.01)

(52) U.S. Cl.
CPC ............ *C05F 17/0258* (2013.01); *C05F 9/02* (2013.01); *Y02A 40/215* (2018.01); *Y02P 20/145* (2015.11); *Y02W 30/43* (2015.05)

(58) Field of Classification Search
CPC ................................. C05F 17/0258; C05F 9/02
USPC ....................................................... 435/290.1
See application file for complete search history.

(56) References Cited

U.S. PATENT DOCUMENTS

| | | | |
|---|---|---|---|
| 3,647,102 A * | 3/1972 | Cooley | B65F 1/06 220/345.1 |
| 5,340,536 A * | 8/1994 | Datar | A61L 11/00 219/688 |
| 6,150,939 A * | 11/2000 | Lin | B65F 1/1426 248/147 |
| 2002/0190615 A1* | 12/2002 | Lin | B65F 1/1426 312/297 |
| 2009/0194532 A1* | 8/2009 | Yang | B65F 1/1638 220/211 |
| 2010/0176128 A1* | 7/2010 | Nance | B65F 1/1431 220/211 |
| 2013/0217111 A1 | 8/2013 | Chang | |
| 2016/0251158 A1* | 9/2016 | Ditzler | B65F 1/004 206/459.5 |
| 2017/0260108 A1 | 9/2017 | Koh | |

FOREIGN PATENT DOCUMENTS

| | | |
|---|---|---|
| JP | 1111603 A | 1/1999 |
| JP | 11137352 A | 5/1999 |
| JP | 2009274049 A | 11/2009 |

OTHER PUBLICATIONS

Parr, Hydraulics and Pneumatics, 1991, Butterworth-Heinemann, pp. 6-7 (Year: 1991).*

* cited by examiner

Primary Examiner — Kevin Joyner
Assistant Examiner — Holly M Mull
(74) Attorney, Agent, or Firm — McGarry Bair PC

(57) ABSTRACT

The disclosure relates to a composting device including a housing defining an interior with an access opening providing access to the interior, a composter bin located within the interior and in communication with the access opening, and a user operated door slidably mounted to the housing and electrically powered to automatically slide along a sliding path between opened and closed position.

20 Claims, 4 Drawing Sheets

COMPOSTING DEVICE WITH SLIDING LID

BACKGROUND

Composting devices are known to implement a composting cycle for biologically and chemically decomposing organic material, such as food waste, into compost for use as a fertilizer and soil amendment. The composting cycle can be implemented in a composting bin by providing water, heat and aeration to the refuse, and can require a period of time for completion. During the disposal of food waste into the composting bin, a user will often have both hands occupied with holding the waste material. Thus, having to manually open the lid of the composting device is inconvenient to the user.

BRIEF SUMMARY

In the present invention, a composting device includes a housing defining an interior with an access opening providing access to the interior, a composter bin located within the interior and in communication with the access opening, and a door slidably mounted to the housing and slidable along a sliding path between opened and closed conditions to selectively open and close the access opening. The slidable door is powered by a drive system operably coupled to the door and having an actuator, wherein operation of the actuator by a user energizes the drive system to move the door automatically. The actuator can be in the form of a hand switch, a foot switch, a motion sensor or a proximity sensor. The drive system further comprises a rack and pinion drive, having a toothed rack mounted to the door and a toothed pinion gear enmeshed with the toothed rack and rotatably driven by the electric motor. There are two limit switches controlling power to the electric motor, one located at the end of movement for the open position and the other located at the end of movement for the closed position.

DETAILED DESCRIPTION

Figure 1:
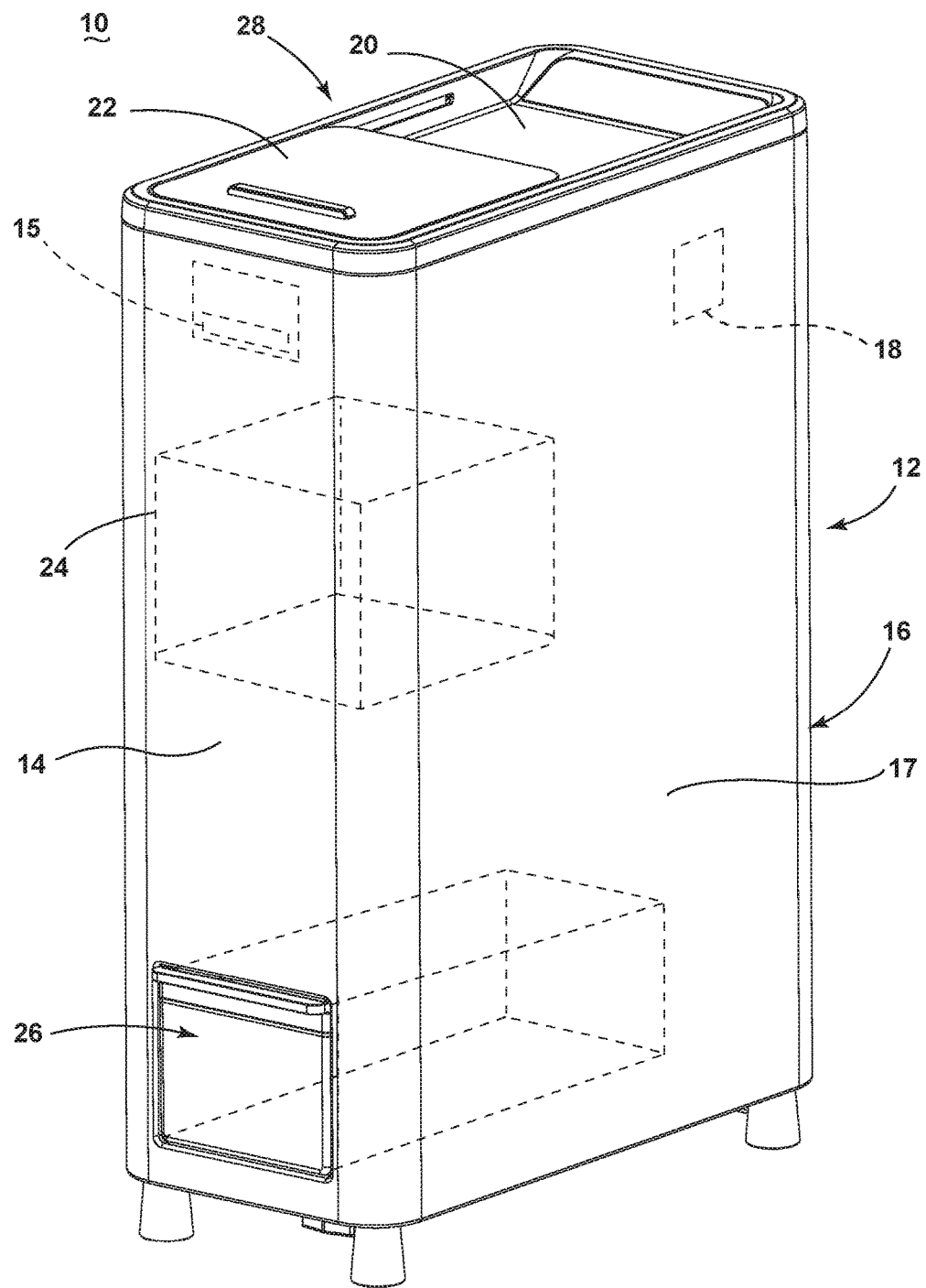
FIG. 1 is a perspective view of a composting device.

FIG. 1 illustrates a perspective view of a composting device 10 or a food recycler for transforming organic material into compost by way of a composting cycle of operation. The composting device 10 can include a housing 12 defining an interior having a front wall 14 spaced from a back wall 16, a pair of side walls 17, and a controller 18 located within the housing 12.

A top wall 20 can enclose the housing 12 at the top of the front wall 14, back wall 16, and the pair of side walls 17. The housing 12 can be any structure for enclosing, supporting and protecting the electrical and mechanical components of the composting device 10 including, but not limited to a cabinet and a frame.

The housing 12 further comprises an automatic sliding lid assembly 28 which can include the top wall 20 and an electrically driven door 22, shown in a closed position, slidably mounted to the housing 12 for sliding movement between open or closed positions to enable access to the interior of the composting device 10. An actuator 15 located on the housing 12 may be used to operate the door 22. The door 22 can be any closure that provides selective access for inputting organic material into the composting device 10, including, but not limited to a hingedly, slidably or removably mounted door, drawer, panel or lid.

While shown in FIG. 1 as coupled to the top wall 20, the door 22 can be mounted to any exterior wall enclosing the housing 12 including, but not limited to the front wall 14. The top wall 20, as well as the remainder of the housing 12, can be formed of any material suitable for construction of the housing structure including, but not limited to metal such as steel or steel alloy, plastic, composite materials such as a hardened polymer composite material and combinations thereof. Some models of composting devices 10 can include decorative panels that can be mounted on the housing 12 or one or more walls.

When in the open position, the door 22 provides access to the interior of the housing 12. In the open position, the door can further expose any element of the composting device 10 interior of the housing 12 including but not limited to a composter bin 24. The composter bin 24 is provided within the housing 12. The composter bin 24 can be disposed beneath the door 22 such that the door provides selective access to the composter bin 24 as the door is opened/closed.

An access drawer 26 is provided and slides in or out through an opening in the front wall 14. The access drawer 26 is a drawer slidably mounted to the housing 12 on a horizontal axis for movement between open and closed positions. It will be understood, however, that access to the interior of the composting device 10 via the front wall 14 can be provided in other ways, including but not limited to, a door pivotally connected to the front wall 14. The access drawer can be detachably mounted to an internal side of the housing 12 and is accessible from outside the housing 12. The access drawer 26 can be removable from the interior of the housing 12 so that the contents thereof can be discharged at will by a user, as for example, by dumping the contents of the drawer 26 onto a garden.

Figure 2:
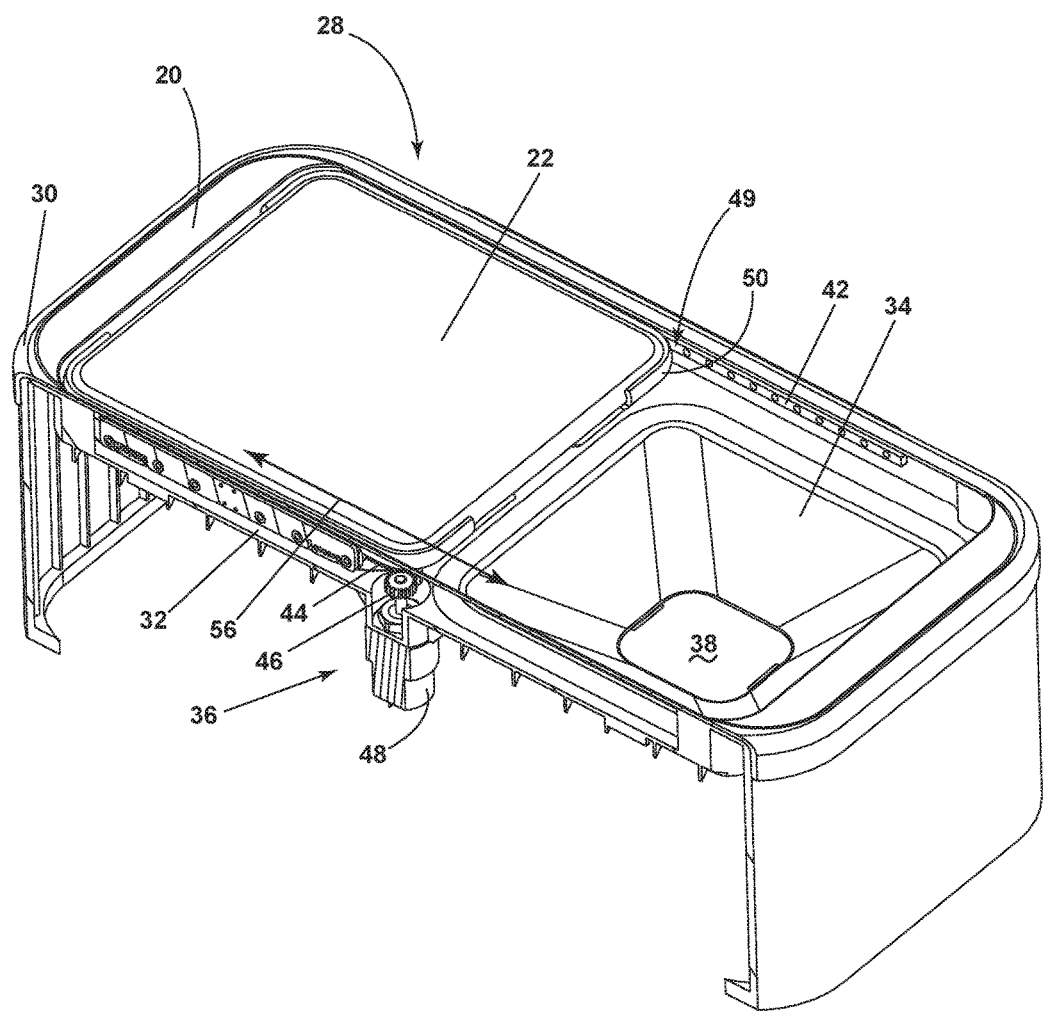
FIG. 2 is a sectional view of the automatic sliding lid assembly with the drive system to move the door between the open and closed position.

Referring now to FIG. 2, the details of the automatic sliding lid assembly 28 are illustrated in greater detail, with the door 22 shown in an opened position. The automatic sliding lid assembly 28 includes an end plate 30, which defines the top wall 20 of the housing 12. The end plate 30 has a barrier portion 32 in which an access opening 38 is formed to receive a removable funnel 34. The funnel 34 defines the access opening 38 providing communication with the composter bin 24.

The automatic sliding lid assembly 28 further includes a slide assembly 49 in the form of a carriage 50 slidably mounted to one or more slide rails 42 supported by the housing 12. The door 22 is mounted to the carriage 50 for cooperative sliding relative to the end plate 30 to effect sliding movement between the opened/closed positions.

More specifically, the carriage 50 is mounted to the bottom of the door 22 and the slide rails 42 are mounted to the end plate 30. The slide rails 42 define a horizontal sliding path 56 for the door 22 between opened and closed conditions to selectively open and close the access opening 38.

A drive system 36 is provided for sliding the door 22 between the opened/closed positions. The drive system 36 has a toothed rack 44 and a toothed pinion gear 46, which is driven by an electric motor 48. The toothed rack 44 is mounted to the carriage 50 and the toothed pinion gear 46 enmeshed with the toothed rack 44. The toothed pinion gear 46 is selectively, rotatably driven by an electric motor 48 in either clockwise or counterclockwise direction to effect the forward/rearward sliding of the door between the opened/closed positions.

Figure 3:
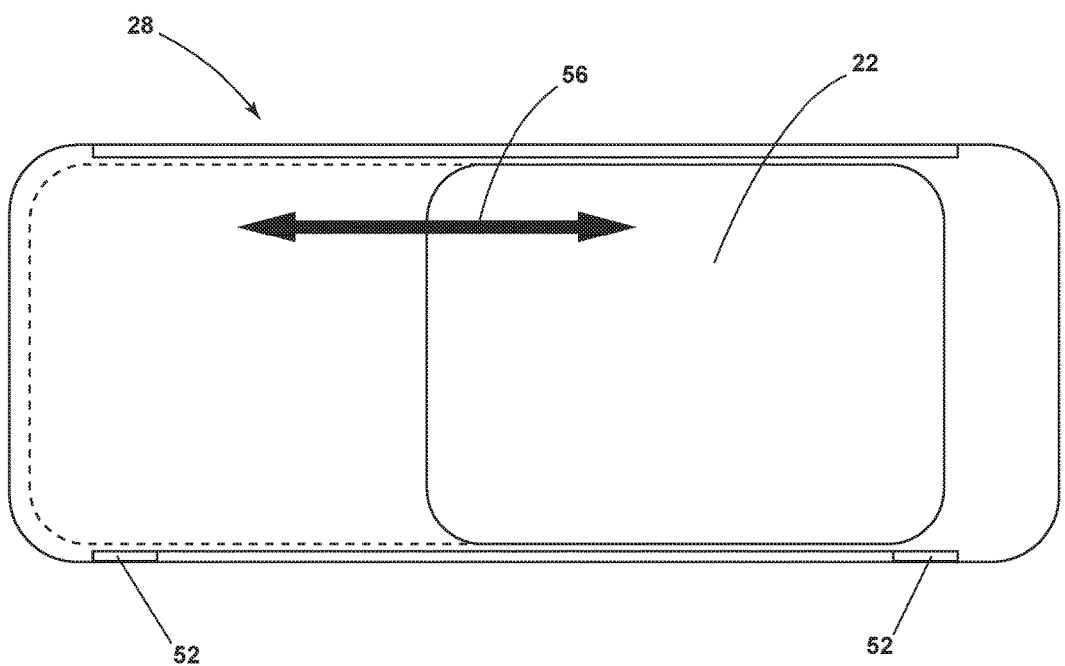
FIG. 3 is a top view of the automatic sliding lid assembly with limit switches on both ends of movement position for the door.

Control elements in the form of the actuator 15 and limit switches 52 are provided to control the sliding movement of the door between the opened/closed positions. The limit switches 52 are located at the end movement position for the door 22. FIG. 3 shows a top view of the automatic sliding lid assembly 28 with two limit switches 52 on both ends of the movement position for the door 22. The actuator 15 can be utilized to selectively energize the electric motor 48 to a sliding movement of the door in one direction or another. As the door 22 moves along the sliding path 56 from the opened/closed position to the other of the closed/opened positions, the door will eventually hit one of the limit switches 52, which terminates power to the electric motor 48.

Figure 4:
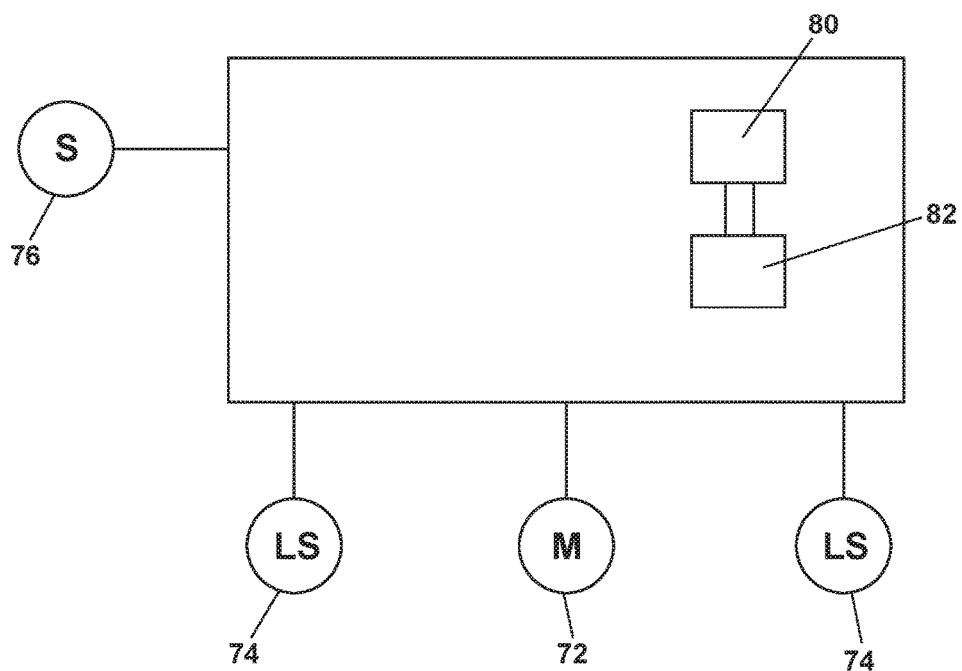
FIG. 4 is a block diagram of the controller for the drive system of the automatic sliding lid.

Referring now to FIG. 4, a schematic of the controller 18 for controlling the operation of the composting device 10 and the automatic sliding lid assembly 28 is illustrated. The controller 18 can be provided with a memory 80 and a central processing unit (CPU) 82. The memory 80 can be used for storing the control software that is executed by the CPU 82 in completing a cycle of operation using the composting device 10 and any additional software. The memory 80 can also be used to store information, such as a database or table, and to store data received from one or more components of the composting device 10 that can be communicably coupled with the controller 18.

The controller 18 can be operably coupled with one or more components of the composting device 10 for communicating with and controlling the operation of the component to complete a cycle of operation. As shown in FIG. 4, the controller 18 is operably coupled to a user activated actuator 15 to control the electric motor 48 of the automatic sliding lid assembly 28 and to receive a return signal from the limit switches 52 to deactivate the electric motor 48.

The actuator 15 send a signal to the controller 18 to selectively energize the electric motor 48 to a sliding movement of the door in one direction or another. When one of the limit switches 52 is actuated, it will send a signal to the controller 18 to cut off power to the electric motor 48 from rotating the toothed pinion gear 46 in the initial direction. The controller 18 will stop the sliding motion of the door 22 to the direction in which the actuated limit switch 52 is located and set a logical flag in the controller for reversing the motor rotation the next time the actuator 15 is triggered. The same mechanic apply when the door slides to the opposite end of the slide rails 42 and triggers the other limit switch 52.

While the actuator 15 is illustrated as a switch on the user interface, the actuator can be any suitable type of actuator and it can be located at a variety of positions. Given that it is contemplated a user's hands may be full of items to place in the composter, the actuator 15 can be of the type that does not require touching by the user, like a proximity or motion sensor. Advantageously, such a sensor could be placed where it is foot activated, such as near the base of the housing, or activated by the user as they near the door with the food items. Suitable proximity or motion sensors can be infrared, ultrasonic, or photo sensors. In addition to proximity and motion sensors, other types of actuators can be used.

While only one actuator 15 is shown, it is contemplated that there can be multiple actuators, which can be of different types and at different locations.

Benefits of the automatic sliding lid assembly include the ease of disposing food waste into the funnel without the need to manually open the door of the composter when the user is holding the waste materials with both hands. The use of actuators 15 such as proximity sensors and motion sensors will further increase the ease of accessing the composter bin. Furthermore, the driving system 36 consisting of an electric motor 48, a toothed rack 44 and a toothed pinion gear 46 will have a simple assembly process and a low production cost.

This written description uses examples to disclose embodiments of the invention, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A food composter comprising:
    a housing having a front wall, a back wall, a top wall and a pair of side walls defining an interior; the top wall comprising an access opening providing access to the interior;
    a composting bin located within the interior and having a fill opening in communication with the access opening;
    a sliding lid assembly comprising:
       an end plate defining the access opening;
       a carriage slidably mounted to the end plate;
       and a door horizontally mounted to a top of the carriage; the carriage horizontally moveable between the front wall and the back wall relative to the access opening; the door maintaining a horizontal position when moved between open/closed positions to selectively open/close the access opening;
    a drive system operable in one of a forward or reverse direction and coupled to the carriage to move the door between the open/closed positions; and
    a controller operably coupled to an actuator and the drive system to selectively energize the drive system when the actuator is triggered by a user; the controller configured to set a logical flag for reversing the drive system rotation between the forward and reverse directions when the actuator is energized by the user.

2. The food composter of claim 1 wherein the drive system comprises an electric motor operable by the actuator.

3. The food composter of claim 2 wherein the drive system comprises a rack and pinion drive, having a toothed rack mounted to the carriage and a toothed pinion gear enmeshed with the toothed rack and rotatably driven by the electric motor.

4. The food composter of claim 3 wherein the drive system further comprises a limit switch located at an end of movement position for the door for at least one of the open/closed positions, with the limit switch controlling power to the electric motor.

5. The food composter of claim 4 wherein there are two limit switches, one located at the end of movement for the open position and the other located at the end of movement for the closed position.

6. The food composter of claim 5 wherein the actuator comprises a switch located on the housing.

7. The food composter of claim 6 wherein the switch is located for at least one of hand or foot operation.

8. The food composter of claim 5 wherein the actuator comprises at least one of a motion or proximity sensor.

9. The food composter of claim 4 wherein the drive system further comprises a slider located on one side of the door and slidably coupling the door to the housing and the toothed rack is mounted to another side of the carriage opposite the slider.

10. The food composter of claim 1 wherein the drive system comprises a rack and pinion drive, having a toothed rack mounted to the carriage and a toothed pinion gear enmeshed with the toothed rack.

11. The food composter of claim 10 wherein the drive system further comprises a slider located on one side of the door and slidably coupling the door to the housing and the toothed rack is mounted to another side of the carriage opposite the slider.

12. The food composter of claim 1 wherein the actuator comprises a switch located on the housing.

13. The food composter of claim 12 wherein the switch is located for at least one of hand or foot operation.

14. The food composter of claim 1 wherein the actuator comprises at least one of a motion or proximity sensor.

15. The food composter of claim 1 wherein the top of the door is flush with the top of the side walls.

16. The food composter of claim 1 further comprising a funnel defining the access opening and providing access to the interior.

17. A food composter comprising:
a housing having a front wall, a back wall, a top wall and a pair of side walls defining an interior; the top wall comprising an access opening providing access to the interior;
a composting bin located within the interior and having a fill opening in communication with the access opening;
a sliding lid assembly comprising:
an end plate defining the top wall;
a carriage slidably mounted to the end plate;
and a door horizontally mounted to a bottom of the carriage between the side walls such that the top of the door defines a portion of the top wall; the carriage horizontally movable between the front wall and the back wall relative to the access opening; the door maintaining a horizontal position when moved between open/closed positions to selectively open/close the access opening; and
a drive system comprising a toothed rack mounted to the carriage, a toothed gear enmeshed with the toothed rack, a motor rotatably driving the toothed gear, and an actuator selectively actuating the motor; and
a controller operably coupled to an actuator and the drive system to selectively energize the drive system when the actuator is triggered by a user; the controller configured to set a logical flag for reversing the motor rotation between a forward and reverse direction when the actuator is energized by the user.

18. The food composter of claim 17 wherein the actuator comprises a switch located on the housing.

19. The food composter of claim 18 wherein the switch is located for at least one of hand or foot operation.

20. The food composter of claim 17 wherein the actuator comprises at least one of a motion or proximity sensor.

* * * * *